United States Patent

Koke et al.

Patent Number: 5,954,371
Date of Patent: Sep. 21, 1999

[54] PLASTIC LINED FITTINGS FOR USE WITH FLANGELESS PIPING SYSTEMS

[75] Inventors: Mark A. Koke; James A. Yanacek, both of Midland; Gerald A. Miller, Auburn; Brian W. Krause, Midland, all of Mich.

[73] Assignee: Crane Co., Stamford, Conn.

[21] Appl. No.: 08/837,168

[22] Filed: Apr. 14, 1997

Related U.S. Application Data

[60] Provisional application No. 60/017,357, Apr. 26, 1996.

[51] Int. Cl.[6] .............................. F16L 9/14; F16L 25/00; B29C 31/06

[52] U.S. Cl. ..................... 285/55; 285/334.5; 138/109; 138/114; 138/140; 264/269

[58] Field of Search ................................... 285/55, 334.5; 138/109, 114, 140; 264/269; 425/129.1

[56] References Cited

U.S. PATENT DOCUMENTS

| 4,377,894 | 3/1983 | Yoshida | 138/140 X |
| 5,199,153 | 4/1993 | Schulte-Ladbeck | 264/269 X |

FOREIGN PATENT DOCUMENTS

| 71808 | 3/1943 | Germany | 285/334.5 |
| 26 33 465 | 2/1978 | Germany | 285/55 |
| 93-026021/03 | 2/1992 | U.S.S.R. | 285/55 |

*Primary Examiner*—Anthony Knight
*Assistant Examiner*—Gary Grafel
*Attorney, Agent, or Firm*—Fitzpatrick, Cella, Harper & Scinto

[57] ABSTRACT

Plastic-lined fittings and their method of manufacture. The fittings are capable of being joined without flanges to plastic-lined piping systems. The fittings feature a zero tolerance fit between the liner and the metal portion of the fitting, and an outward expansion of the portion of the liner which extends past the metal portion.

9 Claims, 3 Drawing Sheets

PLASTIC LINED FITTINGS FOR USE WITH FLANGELESS PIPING SYSTEMS

This application claims the benefit of U.S. Provisional Applications Ser. No. 60/017,357, filed Apr. 26, 1996.

The present invention relates to plastic-lined fittings which are designed for use with plastic-lined pipe, and are capable of being connected to the plastic-lined pipe without the need for flanges.

BACKGROUND AND SUMMARY OF THE INVENTION

Currently available and well known plastic-lined piping products comprise a family of pipes, fittings, and valves especially designed for handling corrosive or high purity liquids. Such products generally comprise steel lined with a polymeric material. Such materials include, but are not limited to polyvinylidene chloride, polypropylene, polyvinylidene fluoride (PVDF), perfluoroalkoxy copolymer, fluorinated ethylene-propylene copolymer, ethylene trifluoroethylene, ethylchlorotrifluoroethylene, and polytetrafluoroethylene. Such products enjoy both the structural integrity of steel and the high chemical resistance characteristic of the selected polymeric liner.

Typically, each pipe, fitting, valve, etc. will contain a flange at or substantially near each end thereof. Adjacent pipes, fittings, valves, etc., within a given pipeline may be joined one to another by the fastening together of such flanges, e.g., by bolting.

While flanged joints are acceptable in most applications, advantage could be had in flangeless joints. Such joints could be constructed to be fluid-proof and vapor-proof, to decrease (if not eliminate) fugitive emissions through the joints. Moreover, such joints would be less bulky than flanged joints, which would make their enclosure within secondary containment systems less unwieldy.

In WO 95/12086 a flangeless pipe joint is disclosed. The disclosed flangeless joints were designed for plastic-lined pipe systems, wherein adjacent plastic liners are joined together by joining means other than compressive force to form a fluid and vapor tight seal between the liners. The disclosure provided for joints in which the linear movement of the polymeric liners was restrained, and which could also be equipped with a secondarily contained leak detection zone for detecting leaks in the joining means.

While these joints successfully join sections of pipe, flanges are still needed to connect the pipe to fittings such as elbows, crosses, tees, laterals, reducers, and other similar types of fittings. The absence of fittings for flangeless piping system is primarily a result of the manufacturing process. Plastic-lined process pipe typically falls into one of three subcategories: loose-lined pipe, interference fit pipe, and swaged pipe.

Loose-lined pipe is characterized by a polymeric liner retained within a pipe only at the points of joinder between adjacent pipe segments, wherein the outside liner diameter is at least about 97 percent of the inside diameter of the pipe segment. Loose-lined pipes are typically manufactured by slipping a pre-formed polymeric liner into a flanged pipe segment, flaring the liner over the structurally rigid flange face, and bolting the flange to an adjacent flange. In loose-lined pipe, the liner is thus retained within the pipe segment by the compressive force exerted on the flared portion of the liner at the flange face. Loose-lined pipe is generally sold as its components, e.g., as pipe segments, polymeric liners, and flanges. In the field, the liner may be inserted into the flanged pipe segment, and may be flared as described above.

Interference fit pipe, which is also known as reverse swaged pipe, is characterized by a zero tolerance fit between the polymeric liner and the pipe segments. Interference fit plastic-lined pipe is typically formed by compressing a preformed polymeric liner having an outer diameter greater than the inner diameter of the pipe segment by passing it through a sizing die, and inserting the compressed liner into the pipe segment before the liner expands. Upon the release of the force by which the liner is pulled through the pipe, the memory of the plastic causes the liner to exert force upon the inner wall of the pipe segment, serving to assist in retaining the liner within the pipe segment. Due to the special apparatus required to achieve the interference fit relationship, interference fit pipe is generally available as pre-lined pipe segments.

Swaged pipe is characterized by a zero tolerance fit between the polymeric liner and the pipe segments. Swaged pipe is typically formed by inserting a preformed polymeric liner into an oversized pipe segment and physically compressing both the pipe and the liner under tremendous pressure such that the liner and the pipe segment are reduced in size to the finished diameters. To further facilitate retention of the liner within the pipe segment, pipe segments to be lined may be "picked" to provide barbs and recessed portions into which the liner is directed during swaging. Due to the special apparatus required to swage pipe, swaged pipe is generally available as pre-lined pipe segments.

Thus, it can be seen that in plastic-lined piping systems the liner is preformed then inserted into the pipe by some means. While this is possible for straight sections of pipe, it is not feasible for fittings with bends and/or additional legs. Thus, typically these types of parts are formed by injection molding. Current methods of injection molding, however, do not produce a zero tolerance fit between the liner and the pipe. Zero tolerance fit piping systems tend to better retain the liner in close proximity with the metal, thus limiting the extent of expansion and retraction of the liner during temperature cycling such as when temperature changes within the piping or when extreme ambient temperatures are encountered. Zero tolerance fit between the liner and the metal also anchors the liner so that it may more easily be prepared for butt welding and to facilitate making the butt weld itself, should that method be used to join the fitting to plastic-lined piping.

Another problem encountered with flangeless joining of current injection molded plastic-lined fittings to zero tolerance plastic-lined piping is that the liner of the fitting does not match up with the liner of the pipe, making it difficult or impossible to securely join the liners. This is because the liner of the pipe is under pressure from either the swaging or reversed swaging process. Thus, where the pipe does not contain the liner, that is, where the liner extends past the pipe, the liner expands outward. In current injection molded plastic lined fittings there is no pressure on the liners, so there is no outward expansion where the liner extends past the metal of the fitting. Accordingly, the liner for a fitting made following current procedures will not align with the liner for the pipe, despite the pipe and the fitting being of the same internal diameter.

It would therefore be desirable to have fittings which could be joined without flanges to the flangeless plastic-lined piping systems contemplated by WO 95/12086, while providing for the liner to be anchored to the pipe fitting in a zero tolerance fit. Accordingly, it is an object of the the subject invention to provide such a fitting.

One aspect of the present invention is a fitting comprising:

a. a section of pipe having two or more legs, each leg terminating in an opening such that fluid may flow through the section of pipe, wherein each leg has an outside diameter and an inside diameter, and wherein the inside diameter terminates at each opening in a chamfered surface such that an angle q is formed between the the chamfered surface and the inside diameter;

b. a liner made from a plastic material which is capable of being injection molded and which shrinks upon cooling following injection molding; the liner having an outside diameter and an inside diameter, the liner extending through the section of pipe such that a portion of the liner extends past each opening;

wherein the outside diameter of the liner in the portion which extends past each opening is larger than the inside diameter of respective leg; and wherein q is greater than or equal to the inverse tangent of the shrink in the liner radius from just after injection molding until cool, divided by the lengthwise shrink of the liner from just after injection molding until cool.

Another aspect of the present invention is a process of preparing a plastic lined fitting comprising:

a. providing a section of pipe having two or more legs, each leg terminating in an opening such that fluid may flow through the section of pipe, wherein each leg has an outside diameter and an inside diameter, and wherein the inside diameter terminates at each opening in a chamfered surface such that an angle q is formed between the the chamfered surface and the inside diameter;

b. inserting a mandrel through the openings, the mandrel having an outside diameter that is less than the inside diameter of each leg such that a plastic material may be injected between the outside diameter of the mandrel and the inside diameter of each leg so that a lining of desired thickness will be formed;

c. providing a cap means extending past the ends of the legs, said cap means having an inside diameter which is larger than the inside diameter of the leg;

d. injecting melted plastic material into the space between the mandrel and the inside diameters of the legs and cap means;

e. removing the cap means and the mandrel; and f. allowing the plastic to cool whereby the newly formed liner shrinks and as the liner shrinks the larger outside diameter sections formed by the cap means are pulled tight against the chamfered surface such that it forms a zero tolerance fit;

wherein the angle q is greater or equal to the inverse tangent of the shrink in the liner radius from just after injection molding until cool divided by the lengthwise shrink of the liner from just after injection molding until cool.

For a more complete understanding of the invention, reference should be made to the Detailed Description of the Invention, which makes reference to the following drawings:

DETAILED DESCRIPTION OF THE INVENTION

Figure 1:
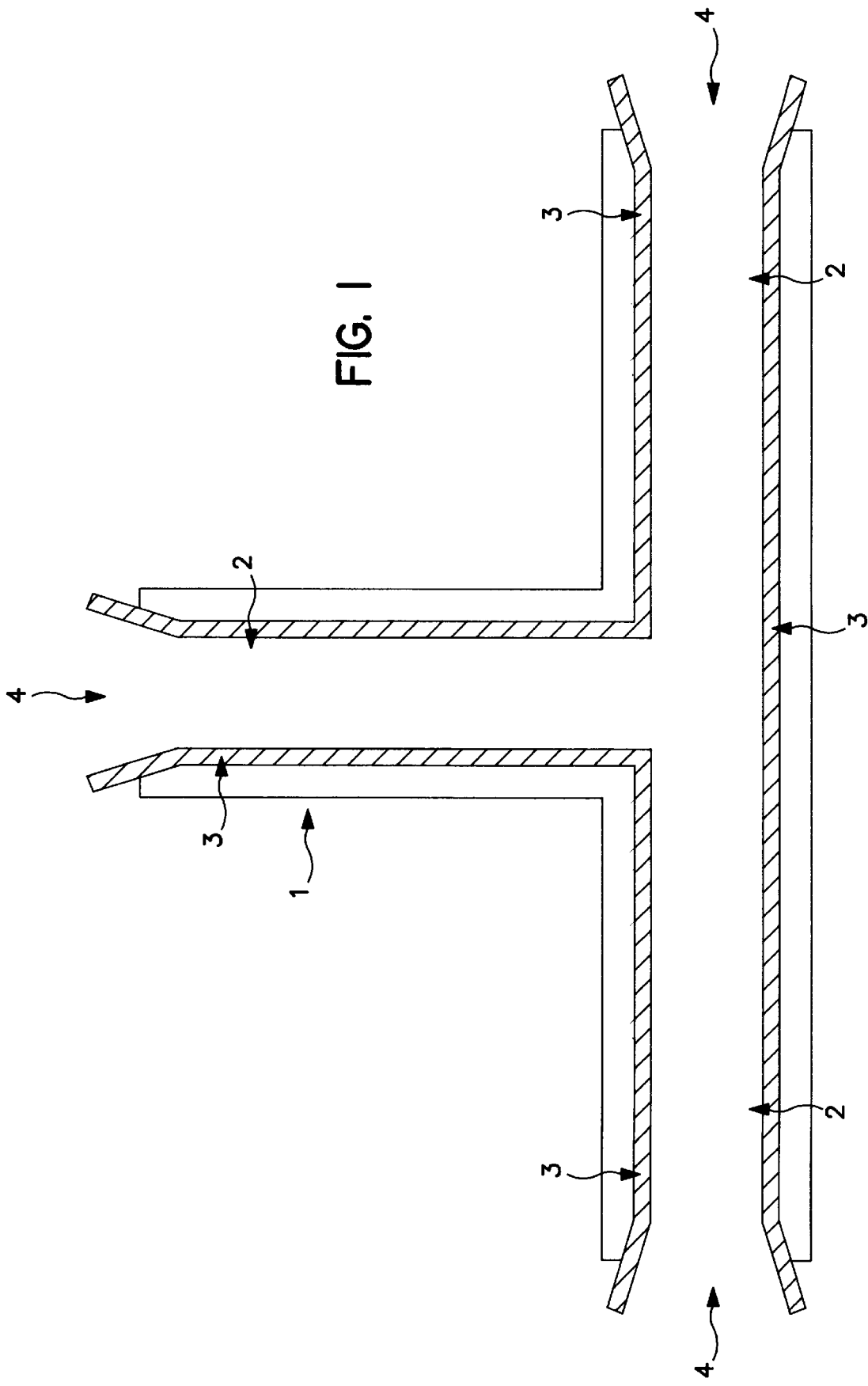
FIG. 1 is a cross section of a tee fitting.

The subject invention provides a polymer-lined pipe fitting capable of being joined to sections of polymer-lined pipe without the use of flanges. In a first embodiment, the subject invention pertains to a plastic-lined pipe fitting, such is as depicted in FIG. 1. It should be noted that while FIG. 1 depicts a "tee", other fittings known in the art, such as elbows, laterals, crosses and reducers can also be made according to the teachings of the invention. As depicted in FIG. 1, a section of pipe 1, having two or more legs 2, each having an opening 4 are lined with a polymeric liner 3. As can be better seen from FIG. 2, each leg 2 terminates in a opening 4 which permits fluid to flow into or out of the leg 2. The pipe leg has an outside diameter 11, and an inside diameter 12. At the end 15 of the leg 2 the inside diameter 12 gets slightly larger such that a chamfered surface 17 is formed. The angle of the chamfer is shown in FIG. 2 as q.

Figure 2:
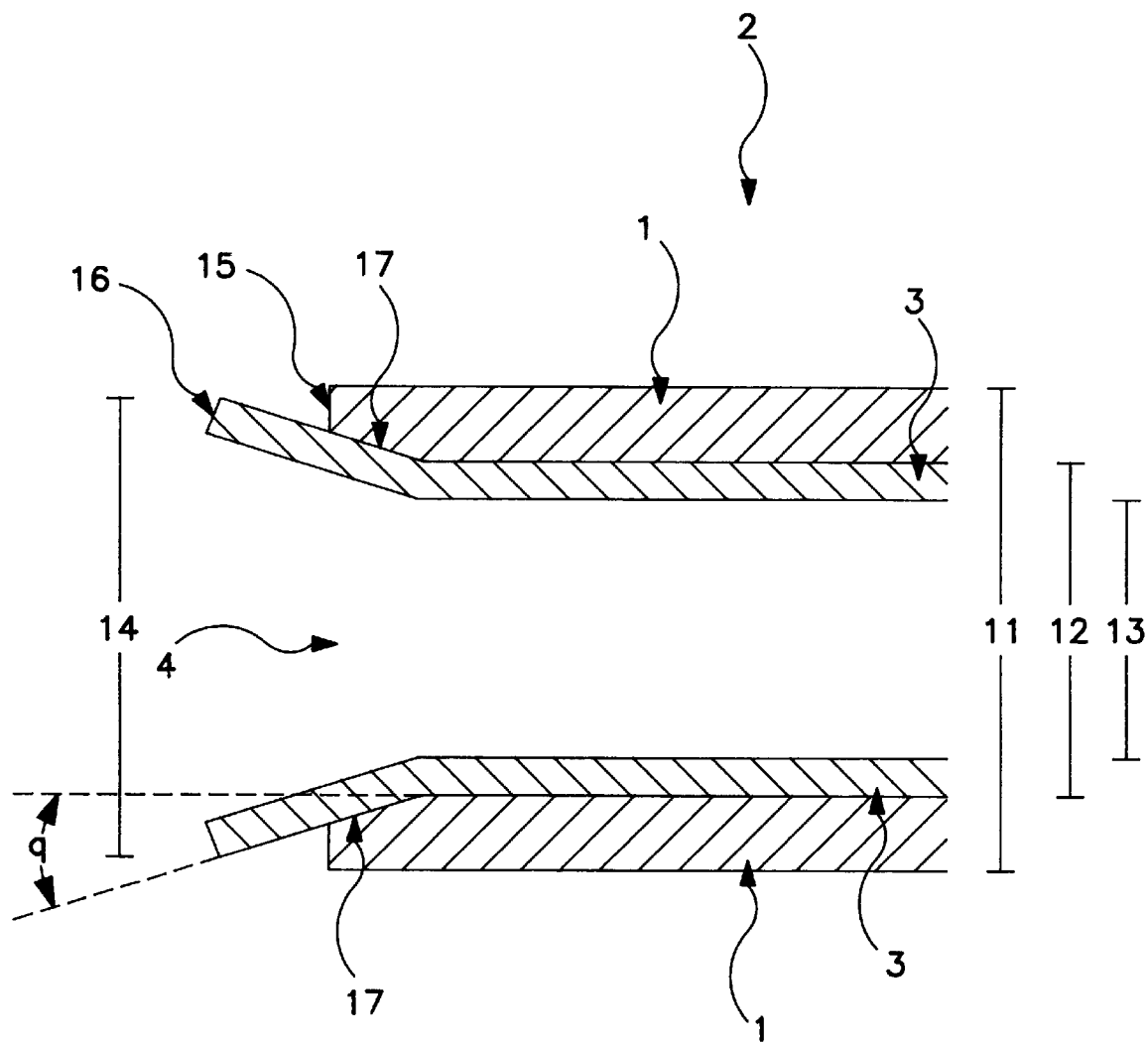
FIG. 2 is a cross section of an opening of a fitting.

Also seen in FIG. 2 is the polymeric liner 3 which has an outside diameter 12 and an inside diameter 13. The liner 3 extends past the end 15 of the pipe leg 2. The end 16 of the pipe liner 3 bulges outward such that at the end 16 the outside diameter 14 of the pipe liner 3 is larger than the inside diameter 12 of the pipe leg 2.

The outer pipe 1 can be constructed of any number of materials commonly used for piping. These are generally comprised of carbon steel (for example, ASTM A587, ASTM A53 GR. B, and ASTM A106) and stainless steel (for example, ASTM A312, TP 304, TP 304L, TP 316, TP 316L). ASTM A587 is the most preferred. Furthermore, the outer pipe 1 can be forged as a single unit, or smaller segments can be welded or otherwise joined together. For smaller inside diameter fittings it is preferred to use a forged body with welded pipe stubs as legs because it allows the manufacturer to grind a smooth internal radius at the transition from one leg to another, such as between the run and the outlet in a tee. It should be noted that the weld bead on each leg of the fitting will provide a source of interference for tooling such as that disclosed in WO 95/12086 which may be useful for installing flangeless joints to connect the fitting to plastic lined pipe segments. Therefore, to accommodate such tooling, it is preferred that the length of the legs of the fittings be slightly longer than those fittings having ANSI dimensions.

Similarly the liner 3 can be chosen from many known materials. Preferably, the liner is chosen from polyvinylidene fluoride, polypropylene, polyvinylidene chloride, perfluoroalkoxy copolymer, or fluorinated ethylene-propylene copolymer. The liner should be capable of being injection molded and should be made from a material which shrinks to some degree upon cooling. Preferably, the material will be capable of being butt welded to the liner of a segment of plastic-lined pipe, as is taught in WO 95/12086.

The angle q of the chamfered surface 17 should be such that as the liner shrinks upon cooling it will draw tight against the outer body 1 at the end 15 of the leg 2. To determine this, the amount of shrinkage of the liner should be known, or at least be able to be calculated. Then a value a can be calculated, where $$a = \tan^{-1}(\text{diameter shrink/length wise shrink})$$

The angle q of the chamfered surface 17, should then be set to be greater than a, to ensure a tight fit of the liner 3 against the outer body 1 at the end 15 of the leg 2.

In another embodiment, the subject invention pertains to a process for preparing fittings of the type depicted in FIG. 1. The first step is to provide a section of pipe having two or more legs. As described above, each leg terminates in an opening such that fluid may flow through the section of pipe. Each leg will have an outside diameter and an inside diameter, and the inside diameter will get sightly larger at the end of the leg such that a chamfered surface having an angle q will be formed. For ease of machining and for the purposes of injection molding, the chamfered surface preferably terminates at the end such that there is some thickness to the end.

Next, a mandrel is inserted through the openings. The mandrel will have an outside diameter that is less than the inside diameter of each leg. The distance between the outside diameter of the mandrel and the inside diameter of the pipe body will determine the thickness of the plastic liner. The mandrel may have one piece which extends through two legs (such as a piece which extends through the run of a tee fitting), or may be made up of a separate piece for each leg. The separate sections of mandrel may be anchored together as is known in the art. Although not necessary, using separate sections of a mandrel for each leg offers the advantage of being able to be expanded outwards such that when the plastic liner is formed it can be of uniform thickness as well as have a larger outside diameter in the portion of the liner which extends past the pipe body.

Figure 3:
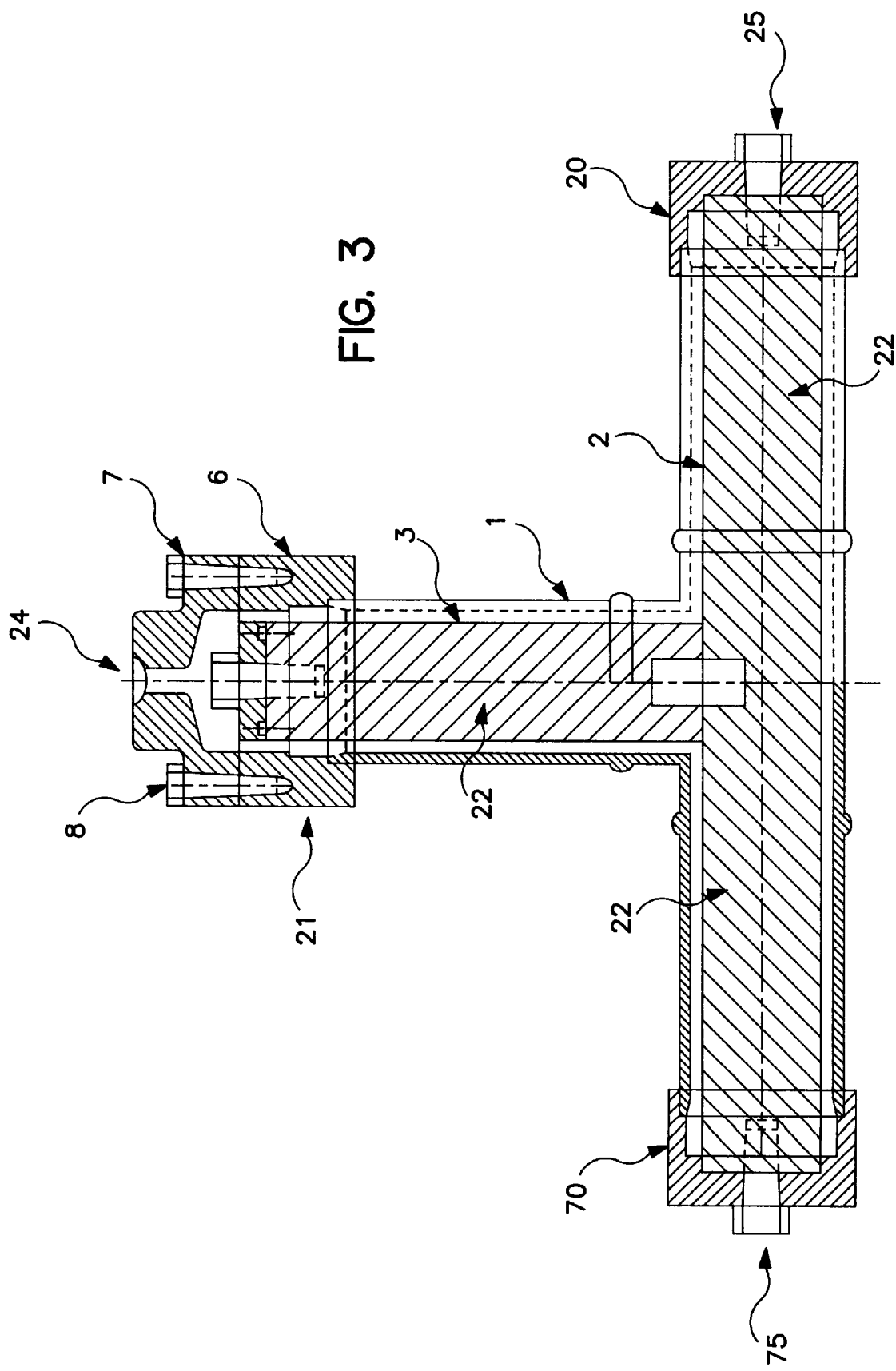
FIG. 3 is a cross section of a tee fitting with the cap means and mandrels in place for injection molding.

As is generally known in the art, a cap means is then placed over the openings of each fitting leg. An example of this is shown in FIG. 3. The cap means 20 anchors the mandrel 22 concentrically around the center line of the leg. This can be accomplished for example by the use of a bolt 25 which extends through the cap into the mandrel 22. The cap means 20 also seals off the openings of the fitting 1 so that when liquid polymeric material is injected around the mandrel, it will be retained. One of the cap means 21 will also have a means 24 for introducing the liquid polymeric material. Thus, once the cap means are in place, the fitting will be a closed system with a space between the mandrels and the inside diameter of the pipe. As shown in FIG. 3, the dimensions of the cap should be configured so that the inside diameter of the cap is greater than or equal to the inside diameter of the leg at the end. This will cause the corresponding segment of the liner which extends past the end of the pipe leg to have an outer diameter larger than the inner diameter of the pipe leg.

Next, the liquid polymeric material is injected through the means 24 for introducing the liquid polymeric material under conditions to sufficiently fill the space between the mandrel and the inside diameters of the legs and cap means. This process is generally known in the art, see for example *Injection Molding Handbook*, Dominick V. Rosato, Donald V. Rosato, Van Nostrand Reinhold Company, 1986, herein incorporated by reference.

The polymeric material is then allowed to cool. As the liner cools, it shrinks, causing the portion of the liner which extends past the ends of the legs (the portion with the larger outside diameter) to be drawn tight against the pipe.

EXAMPLE

The following Example describes the process for developing a tee having a 2 inch internal diameter. The tee was designed to be coupled to a section of plastic-lined pipe according to the process described in WO 95/12086. The particular coupling system and associated installation tooling used was obtained from the Lokring Corporation and was described in WO 95/12086.

To accommodate the installation tooling, a minimum amount of straight unobstructed pipe is necessary. For a two inch diameter pipe that distance is given by the Lokring Corporation to be 4.15 inches. Thus the center line-to-face dimension needs to be at least 5.34 inches (4.15 inches plus half of the diameter of a 2" schedule 40 pipe). As the center line-to-face dimension of a two-inch diameter ANSI tee is only 4.5 inches, ANSI tees could not be used. Accordingly, tees with longer legs were fabricated to provide the proper length. The finished length of the run for the tee was 12.63 inches.

Next a polymeric material was chosen. For this example PVDF was used. PVDF has a shrink rate of from two to three percent. Accordingly, a shrink rate of three percent was used to calculate a. It was determined that the inside diameter of the tee at the ends could be 2.19 inches. Thus a was calculated as follows;

$$\text{Radius Shrink} = (2.19 \div 2) \times (0.03) = 0.033 \text{ inches}$$

$$\text{Lengthwise Shrink} = (12.63 \div 2) \times (0.03) = 0.19 \text{ inches}$$

$$a = \tan^{-1}(0.033/0.19) = 9.8°$$

Accordingly the angle q of the chamfer was set at approximately 10°.

Cap means were then prepared which would provide an as-molded outside diameter of the liner at the point where the liner extends past the tee of 2.19 inches, so that it would match up with the largest inside diameter of the tee. The mandrels and cap means were then installed, and the polymeric material was injected following standard injection molding techniques.

Other embodiments of the invention described above will be readily apparent to those having skill in the art. Accordingly, the scope of the invention shall be limited only by the claims appended hereto.

What is claimed is:

1. A plastic lined fitting capable of being joined to a plastic-lined pipe without the use of a flange, comprising:

a section of pipe having two or more legs, each leg terminating in an opening such that fluid may flow through the section of pipe, each leg having an outside diameter and an inside diameter, wherein the inside diameter terminates at each opening in a chamfered surface such that an angle q is formed between the chamfered surface and the inside surface; and a liner comprising a polymeric material and having an outside diameter and an inside diameter, the liner extending through the section of pipe such that a portion of the liner extends past each opening, wherein the portion of the liner which extends past each opening has an outside diameter that is larger than the inside diameter of the respective leg.

2. A fitting according to claim 1, wherein the outside diameter of each leg is substantially constant at the chamfered surface.

3. A fitting according to claim 1, wherein the liner comprises a material which is capable of being injection molded and which shrinks upon cooling following injection molding.

4. A fitting according to claim 3, wherein q is less than or equal to the inverse tangent of the shrink in the liner diameter upon cooling after the injection molding divided by the lengthwise shrink of the liner upon cooling after injection molding.

5. A fitting according to claim 4, wherein a zero tolerance fit exists between the liner and the section of pipe.

6. A fitting according to claim 5, wherein the liner is comprised of a material selected from the group consisting of polyvinylidene fluoride, polypropylene, polyvinylidene chloride, perfluoroalkoxy copolymer and fluorinated ethylene-propylene copolymer.

7. A fitting according to claim 1, wherein the liner is capable of being butt welded to the plastic-lined pipe.

8. A process of preparing a plastic lined fitting comprising:

a. providing a section of pipe having two or more legs, each leg terminating in an opening such that fluid may flow through the section of pipe, wherein each leg has an outside diameter and an inside diameter, and wherein the inside diameter terminates at each opening in a chamfered surface such that an angle q is formed between the the chamfered surface and the inside surface;

b. inserting a mandrel through the openings, the mandrel having an outside diameter that is less than the inside diameter of each leg such that a plastic material may be injected between the outside diameter of the mandrel and the inside diameter of each leg so that a lining of desired thickness will be formed;

c. providing a cap means extending past the ends of the legs, said cap means having an inside diameter which is larger than the inside diameter of the leg;

d. injecting melted plastic material into the space between the mandrel and the inside diameters of the legs and cap means and;

e. removing the cap means and the mandrel.

9. A process according to claim 8, further comprising the step of allowing the plastic material to cool, wherein as the plastic material cools, it shrinks so that the larger outside diameter sections formed by the cap means are pulled tight against the chamfered surface such that a zero tolerance fit is formed.

* * * * *